United States Patent [19]

Cooper

[11] 4,333,691
[45] Jun. 8, 1982

[54] ROTARY ROCK BIT WITH IMPROVED THRUST FLANGE

[75] Inventor: Thomas W. Cooper, Mansfield, Tex.

[73] Assignee: Dresser Industries, Inc., Dallas, Tex.

[21] Appl. No.: 195,468

[22] Filed: Oct. 9, 1980

[51] Int. Cl.³ .................... F16C 33/10; F16C 33/66; E21B 10/22

[52] U.S. Cl. ..................... 308/8.2; 175/371

[58] Field of Search ............... 308/8.2; 175/227, 228, 175/229, 371, 372

[56] References Cited

U.S. PATENT DOCUMENTS

| | | | |
|---|---|---|---|
| 3,235,316 | 2/1966 | Whanger | 308/8.2 |
| 3,844,363 | 10/1974 | Williams, Jr. | 175/371 |
| 3,845,994 | 11/1974 | Trey | 308/8.2 |
| 3,950,041 | 4/1976 | Miglierini | 308/8.2 |
| 4,098,358 | 7/1978 | Klima | 175/371 |
| 4,109,974 | 8/1978 | Svanstrom et al. | 308/8.2 |
| 4,181,185 | 1/1980 | Keller et al. | 175/229 |
| 4,193,463 | 3/1980 | Evans | 175/371 |
| 4,240,674 | 12/1980 | Evans | 308/8.2 |

Primary Examiner—Richard R. Stearns
Attorney, Agent, or Firm—Fred A. Winans

[57] ABSTRACT

A rolling cone cutter earth boring bit is provided having a pair of radial facing thrust bearing surfaces bounding the pilot pin of the journal and the pilot pin cavity on the cone. The thrust bearing surface of the cone defines a plurality of slots open to, and angled forwardly from, the pin cavity, and terminating within the annular bearing area. The bearing surfaces are, upon assembly, lubricated with a "smear grease" which, under drilling operation works its way to the radially outermost area of the bearing surfaces leaving the bearing area adjacent the pilot pin generally depleted of lubricant. The slots, being closed on the outer end and having radially inwardly impelling force, scrape the outwardly migrated lubricant from the journal pin thrust surface and direct it back toward the pilot pin area for redeposition to replenish lubricant in the radially inner area of the bearing.

3 Claims, 4 Drawing Figures

ROTARY ROCK BIT WITH IMPROVED THRUST FLANGE

BACKGROUND OF THE INVENTION

1. Field of the Invention

The present invention relates in general to rotary earth boring bits and, more particularly, to an improved thrust bearing surface between the bearing pin and the rotatable cone of the bit.

2. Brief Description of the Prior Art

A rotary rock bit generally comprises a main bit body adapted to be connected to a rotary drill string. The bit includes individual rotatable cone cutters mounted on bearing pins extending downwardly inwardly from an arm of the main bit body generally toward the center of rotation. Bearing systems are provided between each cone cutter and the associated bearing pin to reduce friction from rotation of the cutter as the bit and the cutters rotate during drilling. In order to obtain acceptable penetration rates with a rotary rock bit in some formations, it is necessary to apply heavy loads on the bit and to operate the bit at moderate speed.

The rotary rock bit operates under a highly abrasive and corrosive environment and is subjected to temperature extremes as the drilling operation is often conducted thousands of feet underground wherein elevated temperatures are encountered. The bit is cooled by continually flushing its exterior with a circulating drilling fluid which also carries away the drill cuttings. This fluid is generally corrosive and contains abrasive particles and would cause damage to bearing surfaces should it have access to them.

Thus, in view of these circumstances, it can be appreciated that a bearing system for a rotary rock bit must be constructed so that it will provide exceptional performance characteristics within a limited geometrical configuration. Since the entire drill string must be withdrawn to replace a bit should it fail, it is highly desirable to have the bearing systems of the bit operate for an extended period of time.

The development of journal bearing rotary rock bits has included the use of matched radial surfaces perpendicular to the axis of rotation between the journal pin and the cone cutter as thrust bearing surfaces. The radial surface on the journal pin usually contains a circular groove surrounding a pilot pin, extending axially from this surface. The groove is filled with a hardmetal which has a demonstrated ability to reduce friction and to withstand wear. To decrease friction and wear, the facing radial bearing surface in the cone cutter may be carburized. It has been common to provide such a surface with various indentations such as slots or drilled recesses containing a relatively soft alloy metal such as copper, silver, beryllium-copper, or aluminum-bronze to form a bearing pair with hardmetal against soft metal to reduce galling. In addition, it is common practice to grease each bearing surface with a "smear grease" prior to assembly of the cone cutter on the pin.

In U.S. Pat. No. 3,235,316 to J. R. Whanger, patented Feb. 15, 1966, a journal thrust bearing for a rock bit is shown with alternating surface areas of wear-resistant and anti-galling materials. The bearing system disclosed therein includes grooves in the bearing surface of the rotatable member filled with a soft metal having anti-galling characteristics to further reduce friction and wear between the two surfaces.

SUMMARY OF THE INVENTION

The present invention provides a rolling cone cutter earth boring bit having opposed annular thrust flange bearing surfaces surrounding the pilot pin cavity of the journal pin and cone cutter respectively. The bearing surface of the journal pin may contain a groove filled with a hardmetal material and machined to the general plane of the thrust bearing surface to define a mating surface for the thrust bearing surface of the cone cutter. The bearing surface of the cone cutter defines a plurality of generally equiangularly spaced slots extending from, and open to, the innermost radial portion of the bearing surface adjacent the pilot pin cavity. The slots extend therefrom in the general direction of rotation of the cone (as from generally tangential to the cavity to within substantially 30° of tangential). The slots are closed on their outer end and define generally sharp corners with the bearing surface. Upon assembly, the bearing area including the slots is filled with "smear grease". Under operating conditions, the "smear grease" works its way (i.e. as through centrifugal force) to the radial outer areas of the bearing surfaces whereupon the slots scrape the lubricant therefrom. As they are full of lubricant, and as aided by their directional orientation, the grease therein is forced to move radially inwardly to be redeposited on the radially inner area of the bearing surfaces to maintain a film of lubricant throughout their engaging surfaces to thereby extend the bearing life.

In addition to providing a return lubricant flow passage from the radial outer portion to the radial inner portion of the bearing, the grooves or slots provide a lubricant reservoir, open across the radial extent of the bearing surface, and a debris trap in which wear debris from the surfaces or contaminant particles can be accumulated and trapped.

Further, in that the closed end of the slot is closely adjacent an upstanding vertical annular wall of the cone cavity, it is difficult to machine such slots into the surface. Thus, the invention also includes the method of fabricating the rock bit of the above configuration by coining or stamping the slots into the cone thrust bearing surface subsequent to a first or rough machining of the cone but prior to heat treating and final machining of the bearing surface.

DESCRIPTION OF THE PREFERRED EMBODIMENT

Figures 1, 2, 3, 4:
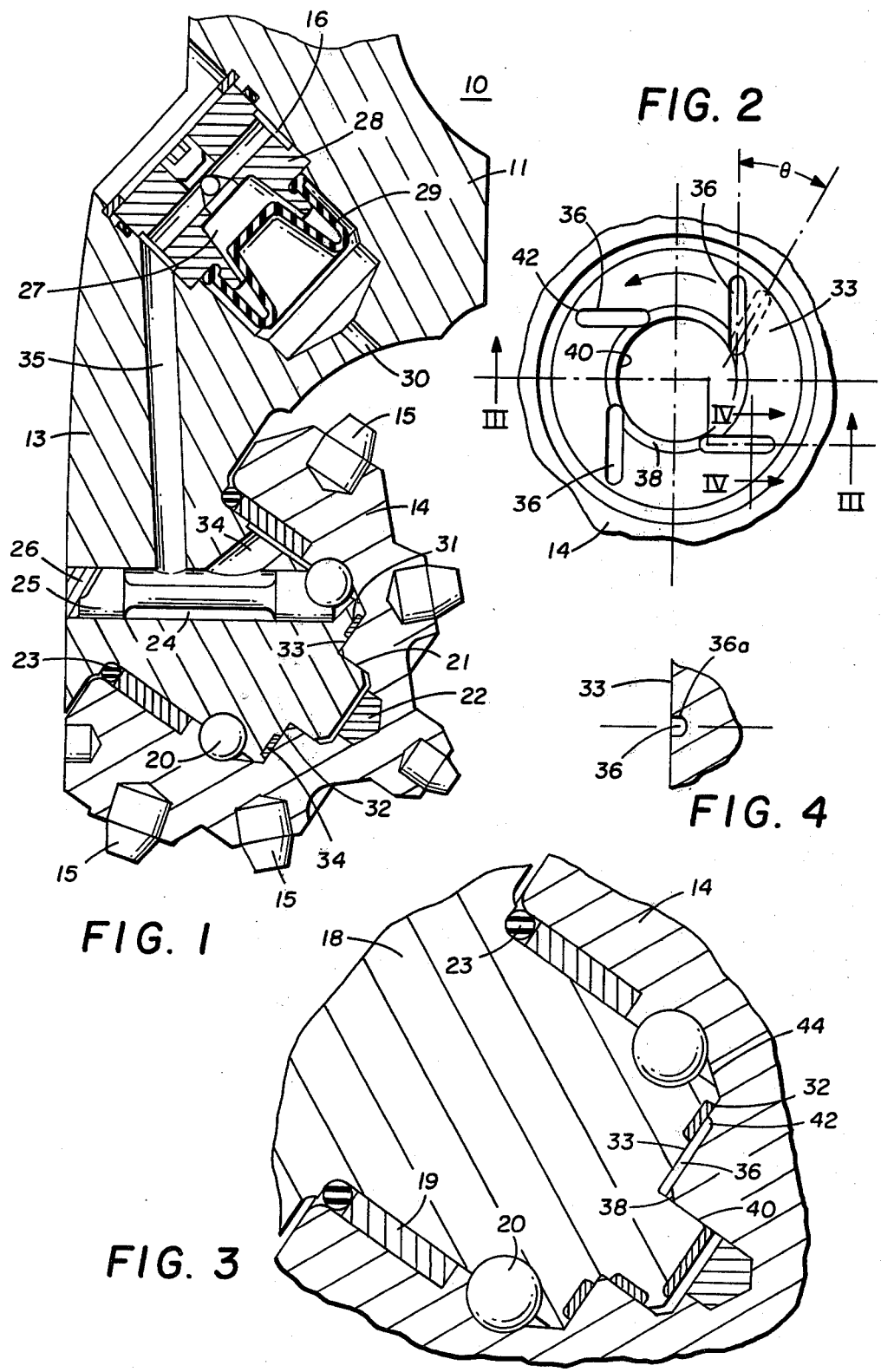
FIG. 1 is a cross-sectional view generally along the vertical axis of one arm of an earth boring bit constructed in accordance with the present invention.
FIG. 2 is a plan view of the thrust flange of the cutter shown in FIG. 1.
FIG. 3 is an enlarged cross-section view similar to FIG. 1 but along line III—III of FIG. 2; and, FIG. 4 is a cross-sectional view of a portion of the thrust flange of the cone transverse to the slot therein.

Referring now to FIG. 1, the cross-sectional view of one arm 13 of a three-cone rotary rock bit 10 is shown. It is to be understood that the bit includes two or more other similar arms extending downwardly from bit body 11 and constructed according to the arm described herebelow.

A rolling cone cutter 14 is rotatably positioned on the journal portion or journal bearing pin 18 of the arm 13.

As the cone rotates, the cutting structure 15 on the surface of cutter 14 contacts and fractures the formations in a manner that is well known in the art. The cutting structure 15 is shown in a form of sintered tungsten carbide inserts. However, it is to be understood that other cutting structures such as hardfaced steel teeth may be used on the cone cutter 14.

The body of the bit 10 includes an upper threaded portion that allows the bit to be connected to the end of a rotary drill string and further includes a central passageway extending along the axis of the bit to allow drilling fluid to enter from the upper section of the drill string (such structure not shown but well known in the art). The drilling fluid exits the bit body above the cutters and passes downwardly to the bottom of the well bore to flush cuttings and drilling debris from the well bore.

A bearing system defining a plurality of bearings is located in the area between the bearing pin cavity of the cutter 14 and the bearing pin 18. The bearings include an outer friction bearing 19, a series of ball bearings 20, an inner friction bearing 21, a thrust button 22 and thrust flange bearing 32, 33. A suitable seal such as O-ring 23 is positioned between the cutter 14 and the bearing pin 18. This seal retains lubricant in the bearing system and prevents any materials in the well bore from entering the bearing area. A passageway 24 allows the balls that make up the ball bearing system 20 to be inserted into position after the cone cutter is placed on the bearing pin 18. The series of ball bearings 20 serves to lock the cone cutter 14 on the bearing pin 18. After the balls are in place, a plug 25 is inserted into the passageway 24 and welded therein by weld 26. Plug 25 has a reduced diameter throughout the major portion of its length to allow lubricant to flow through the passageway 24.

A cylindrical reservoir chamber 16 is located in the bit body 11. A lubricant reservoir 27 containing a suitable lubricant is positioned in the chamber 16. The lubricant reservoir 27 consists of a lubricant canister 28 with a flexible diaphragm 29 attached. A vent passage 30 allows the pressure of the fluid in the borehole to be transmitted to the flexible diaphragm 29. A passage 35 extends from the chamber 16 to the bearing area between the cutter 14 and the bearing pin 18. Lubricant in the reservoir 27 can thus flow through the passage 35 to the bearing areas through passages 24 and 34 in the journal pin.

Development of journal bearing rock bits has included the use of matched facing engaging radial surfaces 32 and 33 on the pin and cone respectively as thrust bearing surfaces. The radial surface 32 on the bearing pin is generally known as the journal inner flange. A circular groove 31 is machined into surface 32 and filled with a hardmetal 34 which has a known, demonstrated ability to reduce friction and withstand wear. The matching radial thrust surface 33 in the cone 14 is carburized to provide a harder face than normal steel thereby producing a longer wearing bearing.

Referring now to FIGS. 2 and 3, the thrust bearing surface 33 and surrounding structure within the cone cutter 14 is illustrated in more detail. As therein seen, the bearing surface 33 contains a plurality of grooves 36 (four being illustrated but the invention also contemplates two such grooves) generally equi-angularly spaced about the annular surface 33. The grooves 36 extend from and are open to a chamfered surface 38 at the juncture of the radial surface 33 and the axial surface 40 defining the pilot pin cavity, the surfaces 38 and 40 defining an inner shoulder.

It is to be noted that the grooves 36 extend outwardly so as to have a forward extending component in the direction of rotation of the cone 14 (as shown by the arrow). In the embodiment shown, the grooves 36 extend outwardly generally tangentially from the axial surface 40 but it is also within the scope of the invention to have the grooves extend at an angle to tangential (such as shown in phantom lines in FIG. 2) however, such angle $\theta$ should be less than generally 30° with respect to tangential.

The grooves 36 are also seen to terminate at their outer end 42 closely adjacent the axially extending annular surface 44 in the cone, thereby providing a groove which, when the bearing surfaces are in bearing engagement, is open only at its radially innermost end.

It is seen in FIG. 4 that the groove 36 is defined by opposed side walls 36a which form a relatively sharp (i.e. right angle) corner with the thrust bearing surface 33. Thus, the trailing sharp corner provides a scraping edge that will remove excess lubrication from areas between the bearing surfaces and collect it within the groove 36. Also, the scraping edge may maintain the opposed surface 32 relatively free of burrs by planing them off. As a practical matter, the groove 36 has a depth of approximately 1/16" and a width of 0.050 to 0.10 inch.

Prior to assembly of the cone 14 to the bearing pin 18, the bearing surfaces including the grooves, are coated with a smear grease.

During operation the lubricant (i.e. smear grease) between the thrust surfaces 32 and 33 tends to work its way radially outwardly, depleting the radially inner surface from lubricant. Such loss of effective lubrication causes the beginning of undue bearing surface wear and eventually failure of the bearing. However, according to the present invention, the grooves will scrape the lubricant, as it builds up radially outwardly, into the groove which, because it is or becomes full of the lubricant in addition to its angular orientation (which results in an inward force on the lubricant) causes lubricant to be expelled at the radially inner end of the groove to re-coat the radially inner portion of the bearing surfaces and prolong the useful life of the bearing.

In that the groove extends to, but terminates closely adjacent, the axially extending surface 44, it is difficult and time-consuming to machine the grooves 36 without encountering the surface 44. Thus, the grooves 36 are formed in the bearing surface 33 by coining or stamping with an appropriate die after the cutter cone structure has been formed and rough or blank machined, but prior to the surface 33 being heat treated and final machined. After the grooves are stamped, the surface 33 is heat treated (or carburized) and machined to the final dimension and characteristics for mating bearing engagement with the journal pin.

Thus, a thrust bearing surface is provided that has grooves constructed and oriented with respect to the radial bearing surfaces to redistribute lubricant, that has migrated to the radial outer portion of the bearing surfaces, back into the radial inner area of the bearing to maintain the bearing lubricated throughout their engaging surfaces.

The embodiments of the invention in which an exclusive property or privilege is claimed are defined as follows:

1. An improved earth boring bit having a bit body defining a downwardly extending arm with a downwardly, inwardly extending bearing pin, a rolling cone cutter rotatably mounted on said arm, said arm and cone defining cooperating engaging surfaces extending radially with respect to the axis of said pin providing facing engaging thrust bearing areas for the thrust forces between said bit body and said cone, and lubricant disposed between said surfaces to reduce the friction and wear as said cone rotates thereon, and wherein said cooperating radially extending surfaces define a first annular surface on said cone and a mating second annular surface on said pin, said first surface terminating inwardly at an inner shoulder extending away from said arm and outwardly at a second shoulder extending above said first surface toward said arm, said improvement comprising:

a plurality of slots in said first annular surface, said slots open to said inner shoulder and terminating closely adjacent said second shoulder and extending from said inner shoulder to said termination point generally in the direction of rotation of said cone, whereby lubricant migrating outwardly from between said facing thrust bearing surfaces is continuously scraped into said slots and forced back toward the inner shoulder of the annular bearing area for replenishing lubricant to the radially inner area of said thrust bearing area.

2. Structure according to claim 1 wherein said slots define opposed generally axially extending straight sidewalls intersecting said annular bearing surface at a relatively sharp corner to assist in the scraping action for scraping said lubricant into said slots.

3. Structure according to claim 2 wherein said slot configuration also provides a debris trap for receiving wear debris or contaminant particles from between said bearing surfaces and said sharp wall construction minimizes the re-introduction of said debris to between said bearing surfaces.

* * * * *